United States Patent
Surkau et al.

(10) Patent No.: US 6,911,911 B2
(45) Date of Patent: Jun. 28, 2005

(54) LABEL HAVING AN ELECTRONIC CIRCUIT

(75) Inventors: Reinhard Surkau, Furstenfeldbruck (DE); Klaus Dargahi, Munich (DE); Karin Hentsch, Neufahrn (DE); Markus Rubekeil, Munich (DE)

(73) Assignee: Schreiner GmbH & Co., KG, Obershleibheim (DE)

( * ) Notice: Subject to any disclaimer, the term of this patent is extended or adjusted under 35 U.S.C. 154(b) by 83 days.

(21) Appl. No.: 10/225,462

(22) Filed: Aug. 22, 2002

(65) Prior Publication Data

US 2004/0036608 A1 Feb. 26, 2004

(51) Int. Cl.⁷ .............................................. G08B 13/14
(52) U.S. Cl. ............................. 340/572.7; 340/572.1; 340/572.5; 340/572.8; 340/572.9
(58) Field of Search ........................... 340/572.1–572.9, 340/568; 235/492; 156/60

(56) References Cited

U.S. PATENT DOCUMENTS

| | | | |
|---|---|---|---|
| 5,644,295 A | * | 7/1997 | Connolly et al. ......... 340/568.1 |
| 5,767,772 A | * | 6/1998 | Lemaire et al. ............. 340/571 |
| 5,859,587 A | * | 1/1999 | Alicot et al. ............. 340/572.8 |
| 5,867,102 A | * | 2/1999 | Souder et al. ........... 340/572.8 |
| 6,265,977 B1 | * | 7/2001 | Vega et al. .............. 340/572.7 |
| 6,518,887 B2 | * | 2/2003 | Suzuki et al. ............ 340/572.8 |

FOREIGN PATENT DOCUMENTS

| | | |
|---|---|---|
| DE | 693 23 293 T2 | 9/1999 |
| WO | WO 99/14717 | 3/1999 |
| WO | WO 00/45332 | 8/2000 |

* cited by examiner

*Primary Examiner*—Jeffery Hofsass
*Assistant Examiner*—Lam Pham
(74) *Attorney, Agent, or Firm*—Nixon Peabody LLP; Donald R. Studebaker

(57) ABSTRACT

A label comprises an electronic circuit at its underside. The electronic circuit is adapted to be at least partially adhered directly to an object, such as a commodity. If the label is removed from the commodity the electronic circuit remains at least partially sticking to the commodity, so that the label has no longer a functional electronic circuit. Product counterfeiting by exchanging of labels can thus be detected.

9 Claims, 2 Drawing Sheets

LABEL HAVING AN ELECTRONIC CIRCUIT

BACKGROUND OF THE INVENTION

The invention refers to a label having an electronic circuit comprising an underside, at least sections of which are adhesive, by means of which it can be attached to an object.

Labels of this kind are known. They have the property of being detectable due to electromagnetic radiation within the radio frequency range and being able to exchange data with a remote transmitter/receiver. Labels of this type are frequently used to make items theft-proof or in logistical applications.

U.S. Pat. No. 5,644,295 discloses a label that contains a printed conductor that is destroyed when the label is removed. The change in conduction resistance is detected and can be used to set off an alarm.

WO 00/45332 discloses a method of monitoring the status of an antenna of a contact-free chip-card by electrical means. Detection of the least manipulation switches the transponder to an operational status in which all of the data on the chip are deleted so that unauthorized persons cannot access them.

SUMMARY OF THE INVENTION

It is an object of the invention to provide a label having an electronic circuit which provides protection against fraudulent exchanging of labels between commodities and thus guaranteeing that the genuine label is attached to the genuine product.

This object is achieved by positioning the electronic circuit on the underside of the label and by giving the electronic circuit an adhesive area by which it becomes adhesive on the side facing away from the upper side of the label.

The solution represented by the invention achieves a long-lasting adhesion of the electronic circuit or a part of it directly to the object to which the label has been attached. If the label is then, perhaps with fraudulent intentions, removed from the original object, the electronic circuit will remain on the object in the scope of the adhesive area and the removed label will either have no electronic circuit at all or only a non-functional part of one. When an object with such a label is then put through an automated electronic control system, it will immediately become apparent that the electronic circuit is unable to respond properly to the inquiry signal from the control apparatus. The object incorrectly labeled with the label can thus readily be detected and separated from other items.

The electronic circuit can include an antenna, preferably a printed antenna. For this purpose, an electrically conductive strip can be printed, for instance using the serigraphic method, onto the underside of the label.

The electronic circuit can also include a chip component with the capacity to store information and to send response signals to the appropriate electromagnetic inquiry signals.

It is advantageous for the electronic circuit to be a transponder circuit.

The chip component is preferably connected to the antenna by means of a conductive adhesive. By this method, both electrical contact and mechanical attachment are realized.

The label can comprise a single self-adhesive strip of material, but it is preferably made up of two material layers, namely an upper material layer and a carrier layer attached to the upper material layer. It is preferable to position the electronic circuit on this carrier layer, which can be said to define the underside of the label.

In a preferable embodiment of the invention, the electronic circuit is coated with adhesive on its entire exposed outer surface to form an adhesive area. When the label as per the invention is then freed from its protective foil or is pulled off of an adhesive-repellent carrier strip, the electronic circuit is exposed on the underside of the label and will, due to its adhesive properties, be attached in a solid and long-lasting manner to an object to which the label is attached.

In a preferable embodiment of the invention, the area of the solid and long-lasting attachment (hereinafter the adhesive area) extends to cover the entire electronic circuit. When the label is torn off in this embodiment, the entire electronic circuit would then remain on the object, so that the label would lose its electromagnetic transponder capability.

In an advantageous variant of the invention, however, the adhesive area on the electronic circuit covers only part of the antenna. The result is that when the label is removed from the original object only part of the antenna remains on the original object. This renders the antenna useless, so that now neither the removed label nor the object to which it was fastened possesses a functional electronic circuit that would enable it to pass an electronic check for originality.

In a further advantageous variant of the invention, the adhesive area on the electronic circuit covers the chip component. In case of (fraudulent) removal of the label, the electronic circuit would be separated into the antenna and chip components, so that here again both parts would not be functional.

In a particularly advantageous embodiment of the invention, the adhesive area on the electronic circuit covers about one-half of the chip component. Part of the chip component therefore adheres to the object to which the label has been applied and the rest adheres to the label. When the label is pulled off, the chip component breaks into two pieces, thus ensuring the absolutely reliable destruction of the electronic circuit.

In a further advantageous variant of the invention, the adhesive area covers a conductive bridge consisting of conductive adhesive. Such a conductive bridge can be located, for example, in the antenna or in another conductive connection of the electronic circuit. When the label is removed from the object to which it was attached the conductive bridge remains on the object, disturbing the function of the electronic circuit remaining on the label.

In a further advantageous version of the invention, suitable measures are taken to render the connection between the electronic circuit and the underside of the label relatively easy to break in the adhesive area or at least in part of it. This ensures that when the label is removed the adhesive area of the electronic circuit will remain on the object reliably so that it cannot, for instance, be torn away with the label. Such a low level of adhesion between the electronic circuit and the underside of the label can for instance be achieved by using an adhesive with a low level of adhesive strength or an anti-adhesion agent in this area.

The invention is described in greater detail below based on several exemplary versions shown in schematic diagrams. The drawings are not true so that all components can be shown clearly; i.e. the layer thicknesses are exaggerated in relation to the other dimensions of the labels. Figure contents:

DETAILED DESCRIPTION OF THE INVENTION

Figure 1:
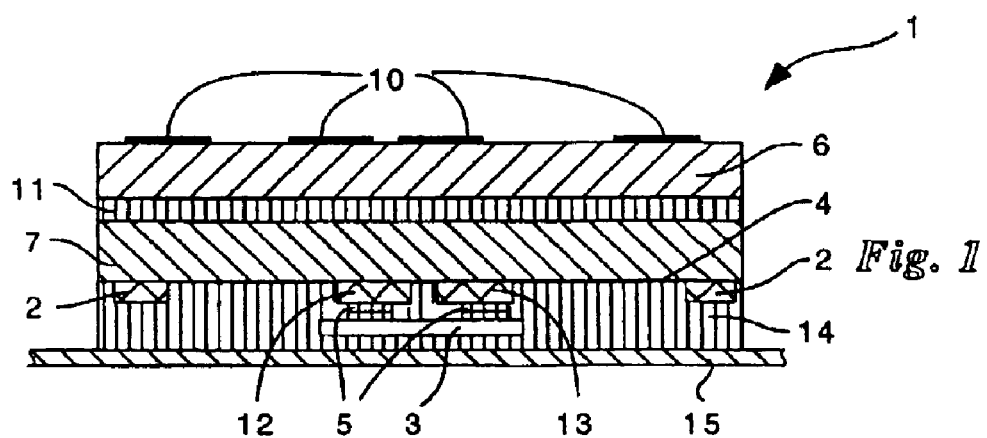
FIG. 1: A cross-section of a first embodiment of the label according to the invention.

The label 1 shown in FIG. 1 has an upper material layer 6 that can consist of paper or plastic. Printed information 10 is positioned on the side of the upper material strip 6 (hereinafter "upper side") shown in FIG. 1 above, which information is symbolized by four black lines. The upper material layer 6 features a layer of adhesive 11 on the side facing the printed upper side, with which it is connected by means of a carrier layer 7. An electronic circuit is located on the free side of the carrier layer 7 (hereinafter "underside") comprising the antenna 2 and a chip component 3. For reasons of clarity of presentation, only one coil of the antenna 2 is shown. Of course such antennas usually comprise several spiral coils. The chip component 3 is connected both electrically and mechanically with two contact electrodes 12 and 13. A conductive adhesive 5 was used to establish the electrical and mechanical connection.

The underside of the label, including the electronic circuit positioned on the underside, is covered with an adhesive glue mass 14. The composite label, structured as described, is positioned on an adhesive-repellent carrier strip 15 that protects the adhesive layer 14 from undesirable contact with other objects.

Figure 2:
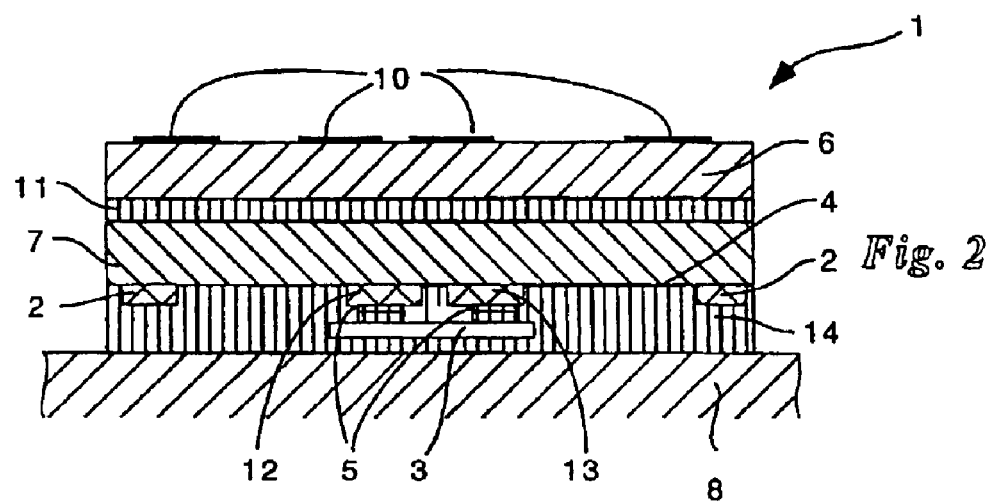
FIG. 2: The label from FIG. 1 adhering to an object.

FIG. 2 shows the label from FIG. 1 already attached to an object 8 (instead of the adhesive-repellent carrier strip 15). To position the label on an object, the label is separated in the known manner from the adhesive-repellent carrier strip 15, either manually or mechanically, and attached to an object 8 onto which it is pressed so as to create a solid connection to the object. Due to the action of the adhesive glue mass 14, not only the label 1 but in particular also its electronic circuit 2, 3 adheres solidly to the object. When the label is pulled off, the entire electronic circuit therefore remains on the object so that the removed label has no electronic circuit that would make it identifiable as an original label.

Figure 3:
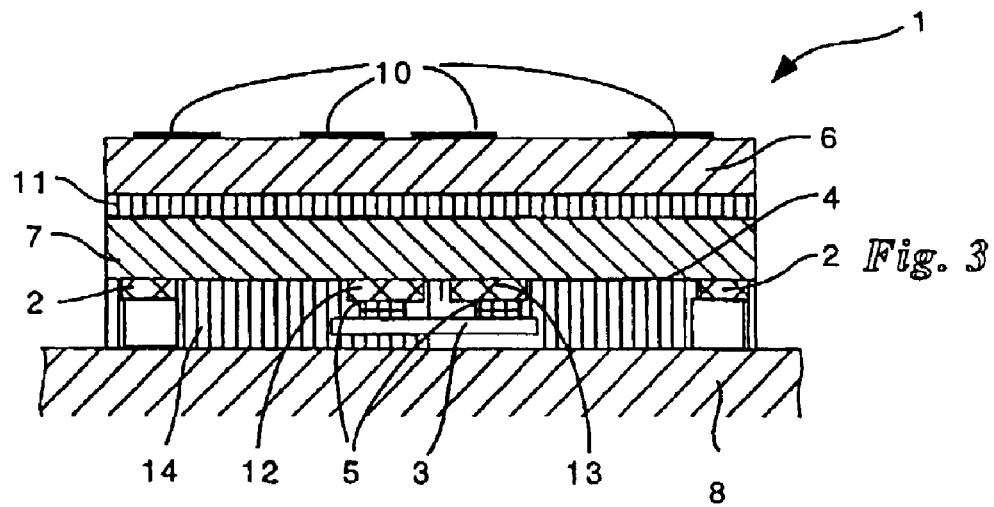
FIG. 3: A cross-section of a second embodiment of the label according to the invention.

FIG. 3 shows a second embodiment of the label according to the invention. A comparison with the figures already described shows that the structure of the label is very similar to that in FIG. 1, for which reason the description is limited to the differences between this Figure and FIG. 1 so as to avoid repetitions. In contrast with the label in FIG. 1, the part of the chip component 3 shown on the right in FIG. 3 is not covered by the glue mass 14 and is thus not solidly attached to the object 8 to which the label 1 is attached. The same applies to the antenna 2. The rest of the underside 4 of label 1 is however, similar to FIG. 2, solidly attached to the object 8. In other words: The adhesive area of the electronic circuit 2, 3 covers only part of the chip component 3.

Figure 4:
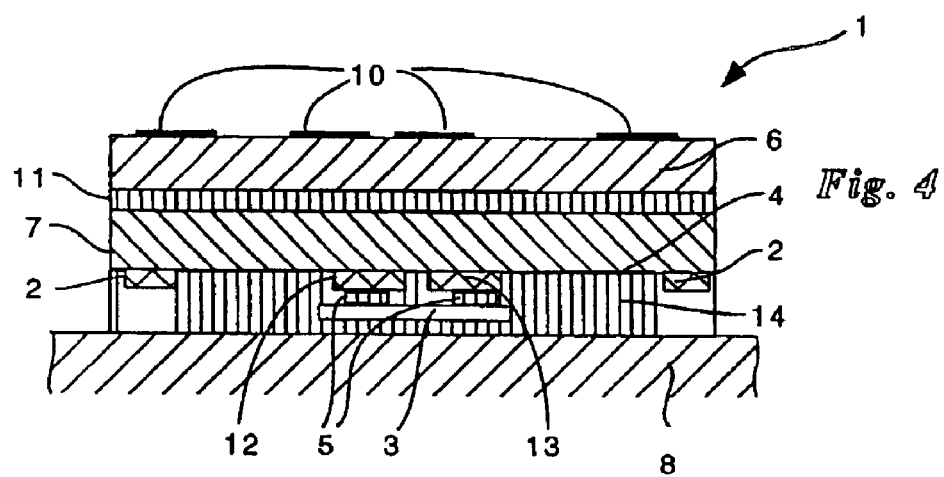
FIG. 4: A cross-section of a third embodiment of the label according to the invention.

In the third version of the invention shown in FIG. 4, the adhesive area of the electronic circuit 2, 3 covers only the area of chip component 3 whereas the antenna areas 2 are kept free of glue adhesive mass 14.

Figure 5:
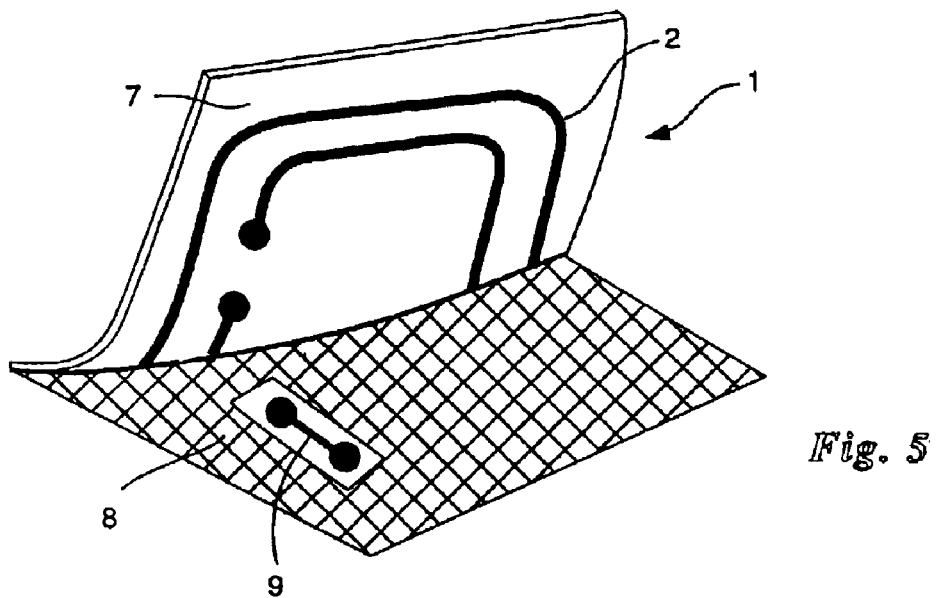
FIG. 5: A perspective drawing of a label as per the invention in a fourth embodiment, whereby the label has been partially pulled off of the object to which it had previously adhered.

FIG. 5 shows a further version in perspective in which only one conductive bridge 9 is part of the adhesive area of the electronic circuit 2, 3, whereas the rest of the electronic circuit 2, 3 is non-adhesive on its underside. When the composite label is removed from an object 8, the conductive bridge 9, which in reality can be very small and hardly noticeable, therefore remains on the object in such a way that the rest of the electronic circuit that is removed with the composite label 1 loses its functionality.

Figure 6:
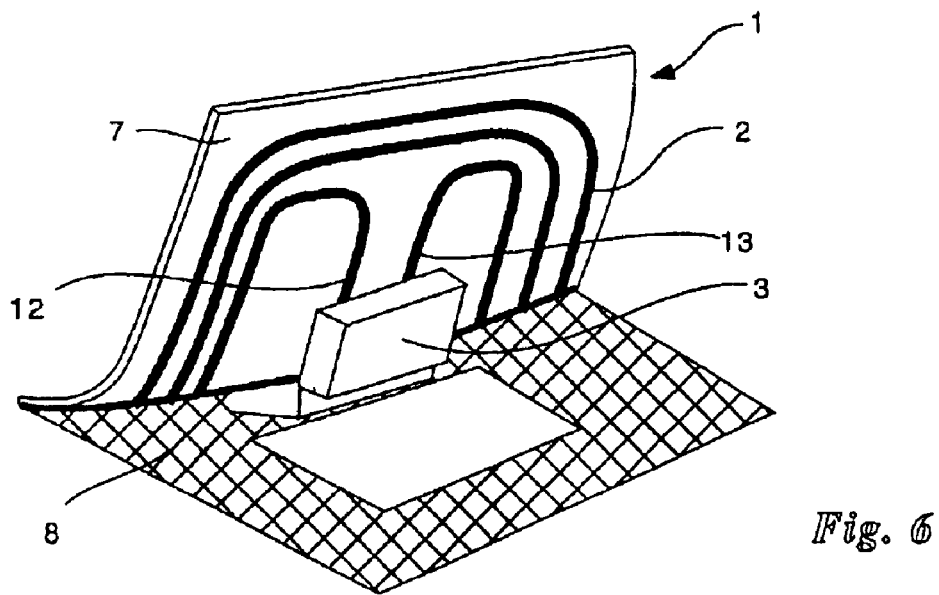
FIG. 6: A perspective drawing of a label as shown in FIG. 3, whereby the label has been partially pulled off of the object to which it had previously adhered.

FIG. 6 shows in a perspective schematic view the behavior of the label in FIG. 3 when it is removed from an object 8 to which it is attached. Since the areas of antenna 2 are not included in the adhesive area of the electronic circuit, i.e. they are free of adhesive mass 14 on their underside, the antenna 2 remains attached to the carrier strip 7. The same applies to that part of the chip component 3 that is free of adhesive mass on its underside. Since, however, the remainder of the chip component 3 is included in the adhesive area of the electronic circuit, i.e. is self-adhesive on its underside, the second area remains solidly attached to the object and the chip component 3 breaks approximately along the borderline between the adhesive area and the non-adhesive area into two parts in such a way that the function of the electronic circuit is reliably destroyed.

In the embodiment of the invention described above, a weak attachment between the electronic circuit and the carrier layer 7 can also be provided for in the adhesive areas of the electronic circuit, so that the above-described separation of the electronic circuit into two non-functional parts is reliably ensured.

What is claimed is:

1. Label having a transponder circuit comprising:

a chip component, an upper side and an underside, said underside including, at least sections having adhesive for attaching the label to an object, said transponder circuit being provided at said underside of said label and comprising an adhesive area on a side facing away from the upper side of the label, wherein said adhesive area covers approximately half of an underside of said chip component to insure that the chip component will be broken when the label is removed from an object to which it is adhered to.

2. Label according to claim 1, wherein said transponder circuit includes an antenna.

3. Label according to claim 1, wherein said label comprises an upper material layer and a carrier layer that defines the underside of the label and is connected to said upper material layer.

4. Label according to claim 1, wherein the adhesive area of the transponder circuit extends over the entire electronic circuit.

5. Label according to claim 1, wherein said adhesive area of the transponder circuit covers said chip component.

6. Label according to claim 1, wherein said transponder circuit being attached to said underside with reduced adhesive strength in at least part of its adhesive area.

7. Label according to claim 2, wherein said antenna is a printed antenna.

8. Label according to claim 2, wherein said chip component is connected with the antenna by means of a conductive adhesive.

9. Label according to claim 2, wherein said adhesive area of the transponder circuit covers part of said antenna.

* * * * *